UNITED STATES PATENT OFFICE 2,276,251

ALKYLATION OF HYDROCARBONS

Jacque C. Morrell, Chicago, Ill., assignor to Universal Oil Products Company, Chicago, Ill., a corporation of Delaware No Drawing. Application February 29, 1940, Serial No. 321,405

12 Claims. (Cl. 196—10)

This invention relates to the treatment of isoparaffinic hydrocarbons, both gaseous and liquid. In a more specific sense the invention is concerned with a novel process for alkylating isoparaffinic hydrocarbons, comprising isobutane and relatively low boiling normally liquid isoparaffins, to produce saturated hydrocarbons of higher molecular weight which can be utilized as components of motor fuel for automobile and airplane engines.

The utilization of these isoparaffinic and olefinic hydrocarbons has been carried out in the presence of sulfuric acid alone or diluted by relatively small quantities of water. The present type of catalyst is a marked improvement over the previous types in that the activity of the catalytic material may be controlled more accurately by proper dilution with relatively inert substances. Also addition of the preferred diluents or spacing agents lowers the freezing point of sulfuric acid of 100% concentration so that this material may be used more conveniently as an alkylating catalyst at temperatures below its normally freezing point which is approximately 10° C.

In one specific embodiment the present invention comprises the alkylation of isoparaffinic hydrocarbons by olefinic hydrocarbons in the presence of sulfuric acid and organic bases or the reaction products between organic bases and sulfuric acid.

A feature of the present invention is the dilution of sulfuric acid of approximately 100% concentration with a non-aqueous diluent so that the ordinarily vigorous reaction of sulfuric acid on catalytic condensation reactions among hydrocarbons is moderated to the extent that reactions of alkylation occur in preference to other less desirable reactions. Also in order to obtain good results it is important to use the proper combination of temperature, time of contact, amount of acid catalyst, and alkylating activity of said acid catalyst in order to avoid side reactions such as oxidation, polymerization, sulfonation, and the like. Inasmuch as considerable heat is evolved during alkylation in the presence of a sulfuric acid-containing catalyst, it may be desirable to cool the isoparaffin hydrocarbons, for example, the isobutane, which is being alkylated with the olefins so that the heat evolved during the reaction will not cause the temperature of the mixture to rise above the desired reaction temperature.

The amount of sulfuric-acid containing catalyst employed is preferably in the approximate range of 20-100 volumes of acid per 100 volumes of hydrocarbons undergoing treatment at any one time, although in some operations, smaller volume ratios of acid to hydrocarbons present in the reaction mixture may be used when employing longer times of contact.

The concentrations of sulfuric acid in the composite catalysts which have been found desirable in the preferred temperature range, for example from approximately −10° to about 30° C. are generally in excess of 90%. For example, good results may be obtained in the alkylation of normally gaseous isoparaffin hydrocarbons with normally gaseous olefins in the presence of approximately 95–90% by weight of sulfuric acid and about 5–10% by weight of a spacing agent selected from a group which will be described in later paragraphs of this specification. Depending upon the reactivity of the hydrocarbon components in a given alkylation reaction, sulfuric acid of different concentrations and different proportions of sulfuric acid and diluents may be employed. These spacing agents may also be employed with sulfuric acid containing an excess of sulfur trioxide and commonly classed as fuming sulfuric acid or sulfuric acid of a concentration in the approximate range of 100–105%. As additional means of regulation of the upper limits of temperature, the concentration of acid and the proportions of acid and diluent shown here may be varied to produce good results, providing they are co-ordinated properly. For instance, the reaction of isobutane with propene may require more severe conditions such as somewhat higher temperature or higher acid concentration than the reaction of isobutane with the more reactive isobutene. Pressures may be employed to assist the reaction and to prevent undue loss of the material by vaporization and, when desirable, to maintain the hydrocarbons undergoing reaction substantially in liquid phase or to effect liquefaction of a portion of the reacting hydrocarbons.

As spacing agents or diluents for sulfuric acid to produce alkylation catalysts suitable for use in alkylation of isoparaffins by olefins the present invention contemplates the use of organic bases, such as amides, amines, imides, imines, pyridines, picolines, lutidines, collidines, etc., whose reaction products with sulfuric acid may be admixed with sulfuric acid. Of the amides, urea is a good example, as this material on treatment with sulfuric acid yields sulfamic acid, a substance suitable for use as a spacing agent or diluent for a sulfuric acid alkylating catalyst. Sulfamic acid may be prepared by treating urea with fuming sulfuric acid as indicated by the following equation:

$H_2NCONH_2 + H_2SO_4 + SO_3 \rightarrow 2HOSO_2NH_2 + CO_2$

Of the amines, aniline is a good example, this substance yielding under certain conditions of treatment sulfanilic and metanilic acids which act as diluting or spacing materials. Pyridine and its homologues may also undergo a certain degree of reaction with sulfuric acid depending upon the strength of the acid and the operating conditions of temperature and pressure.

From the statements hereinabove set forth concerning the types of compounds which may be employed as diluting or spacing materials for sulfuric acid alkylation catalysts, it will be evident that a large number of alkylating catalyst composites of varying composition may be made to suit the needs of different alkylation reactions.

While in most cases the utility of the alkylating composite employed is due principally to the sulfuric acid, it is recognized that the organic compounds used as spacing agents may at times exert a definite chemical influence upon the reactions other than merely moderating the effect of the sulfuric acid. It will also be evident that the selection of any particular compound or mixture of compounds for use with sulfuric acid will be determined by solubility relations, the ease of alkylating the paraffinic hydrocarbons involved, the general operating conditions, and the matter of economy in the cost of the reagents. In general such problems will be solved by those familiar with the art without great difficulty.

The process of the invention is applicable to the alkylation of butanes by their olefinic counter-parts, the butenes, and by propene, and higher olefins. Isobutane can be alkylated much more readily than normal butane by normally gaseous olefins. Apparently normal butane must undergo some isomerization prior to alkylation.

Alkylation of isoparaffinic hydrocarbons by olefins is of particular importance to the oil industry in connection with the cracking process. The fixed gases ordinarily contain large quantities of 3- and 4-carbon atom hydrocarbons both olefinic and paraffinic. Processes are in commercial operation which catalytically polymerize the 3- and 4-carbon atom olefins to form liquid products suitable as hydrocarbon motor fuel but the paraffinic hydrocarbons in these gases are substantially unaffected by these processes. While the production of high octane number motor fuel from gaseous olefins commonly requires two steps of treatment, namely, polymerization followed by hydrogenation; the present process forms iso-octanes and other isoparaffins of motor fuel boiling range by direct alkylation, for example, of isobutane by either normal butenes or isobutene and thus utilizes both olefins and isoparaffins. The actual operation of the process admits of some modification, depending upon the normal phase of the reacting constituents and whether batch or continuous operation is employed.

In a simple type of batch process, a paraffin to be alkylated such as isobutane is brought to a temperature within the approximate range specified in the presence of the necessary amounts of sulfuric acid catalyst and a spacing agent, and alkylation is effected by the gradual introduction of an olefin or preferably an olefin-isoparaffin mixture under the surface of the liquid which may be stirred mechanically to effect intimate contact between catalyst and the reacting hydrocarbons and to prevent settling of the acid catalyst or acid sludge which is heavier than the liquid menstruum. Alkylation may be allowed to progress to different stages of reaction. In the case of the alkylation of isobutane by propene or butenes, the best products from the standpoint of motor fuel are produced usually by the condensation of equimolecular quantities. It is preferable to maintain an excess of isoparaffin at all times in the reaction zone as in the method of operation hereinabove described. The presence of such an excess of isoparaffin tends to minimize undesirable polymerization reactions.

As illustrative of the type of results normally obtainable by the use of th present process, the following examples are shown, although they are not presented with the intention of unduly limiting the generally broad scope of the invention.

*Example I*

151 parts by weight of a solution prepared by saturating 100% sulfuric acid winth sulfamic acid at 20° C. and 232 parts by weight of a butane mixture containing 81% isobutane and 19% normal butane was placed in an autoclave at 10° C. to which 42 parts by weight of propene was added during 3 hours followed by stirring the reaction mixture for 3 hours more. This reaction yielded 79 parts by weight of a substantially saturated hydrocarbon material containing approximately 40% by volume of heptanes boiling in the range of 82–92° C. and a total of 61% by volume of saturated hydrocarbons boiling below 100° C. The total alkylation product obtained in a run of this type had an octane number of 84.

The fact that the yield of liquid product was approximately 164% by weight of the propene reacting indicated that a substantial degree of alkylation had occurred.

*Example II*

A pressure autoclave equipped with a mechanical stirrer was charged with 147 parts by weight of sulfuric acid of 98% concentration, 3 parts by weight of sulfanilic acid, and 232 parts by weight of a butane mixture consisting of 81% isobutane and 19% normal butane. This reaction mixture was stirred at 10° C. while 42 parts by weight of propene was introduced below the surface of the liquid mixture during 185 minutes and the stirring was continued for an additional period of 175 minutes. After this treatment, 72 parts by weight of a substantially paraffinic hydrocarbon layer was separated from the acid catalyst layer. Approximately 50% of the hydrocarbon reaction product boiled in the range of 82–97° C. and consisted of isomeric heptanes. Sixty-seven per cent by volume of the total alkylation product boiled below 100° C.

Similar treatment of a like reaction mixture at 20° C. yielded 68 parts by weighht of a substantially saturated alkylate which contained approximately 30% by volume of heptanes and a total of 41% of hydrocarbons boiling below 100° C.

The broad scope of the present invention is evident from the preceding specification and from the examples given, although neither section is intended to be unduly limiting.

I claim as my invention:

1. A process for producing gasoline boiling range hydrocarbons from isoparaffin and olefin hydrocarbons which comprises simultaneously contacting an isoparaffin and an olefin at an alkylating temperature with sulfuric acid to which has been added an organic base in an amount sufficient to substantially dilute the sulfuric acid, and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

2. A process for producing gasoline boiling range hydrocarbons from isoparaffin and olefin hydrocarbons which comprises simultaneously contacting an isoparaffin and an olefin at an alkylating temperature with sulfuric acid to which has been added a reaction product of sulfuric acid with an organic base in an amount sufficient to substantially dilute the sulfuric acid, and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

3. A process for producing gasoline boiling range hydrocarbons from isoparaffins and olefin hydrocarbons which comprises simultaneously contacting an isoparaffin and an olefin at an alkylating temperature with sulfuric acid to which has been added a substantially neutral organic compound of the reaction between an organic base and sulfuric acid in an amount sufficient to substantially dilute the sulfuric acid and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefinic hydrocarbons to form a heavier hydrocarbon boiling in the gasoline range.

4. A process for producing gasoline boiling range hydrocarbons from isoparaffin and olefin hydrocarbons which comprises simultaneously contacting an isoparaffin and an olefin at an alkylating temperature with sulfuric acid of approximately 90–105% concentration to which has been added an organic base in an amount sufficient to substantially dilute the sulfuric acid, and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

5. A process for producing gasoline boiling range hydrocarbons from isoparaffin and olefin hydrocarbons which comprises simultaneously contacting an isoparaffin and an olefin at an alkylating temperature with sulfuric acid of approximately 90–105% concentration to which has been added a substantially neutral organic compound of the reaction between an organic base and sulfuric acid in an amount sufficient to substantially dilute the sulfuric acid, and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

6. A process for producing gasoline boiling range hydrocarbons from isoparaffin and olefin hydrocarbons which comprises simultaneously contacting an isoparaffin and an olefin at a temperature in the approximate range of −10 to +30° C. with fuming sulfuric acid to which has been added an organic base in an amount sufficient to substantially dilute the sulfuric acid, and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

7. A process for producing gasoline boiling range hydrocarbons from isoparaffin and olefin hydrocarbons which comprises simultaneously contacting an isoparaffin and an olefin at a temperature in the approximate range of −10 to +30° C. with sulfuric acid to which has been added a reaction product of sulfuric acid with an organic base in an amount sufficient to substantially dilute the sulfuric acid, and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

8. A process for producing gasoline boiling range hydrocarbons from isoparaffin and olefin hydrocarbons which comprises simultaneously contacting an isoparaffin and an olefin at a temperature in the approximate range of −10 to +30° C. with sulfuric acid of approximately 90–105% concentration to which has been added a substantially neutral organic compound of the reaction between an organic base and sulfuric acid in an amount sufficient to substantially dilute the sulfuric acid and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

9. A process for producing gasoline boiling range hydrocarbons from isoparaffin and olefin hydrocarbons which comprises simultaneously contacting an isoparaffin and an olefin at an alkylating temperature under a liquefying pressure with fuming sulfuric acid to which has been added an organic base in an amount sufficient to substantially dilute the sulfuric acid, and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

10. A process for producing gasoline boiling range hydrocarbons from isoparaffin and olefin hydrocarbons which comprises simultaneously contacting an isoparaffin and an olefin at an alkylating temperature under a liquefying pressure with sulfuric acid to which has been added a reaction product of sulfuric acid with an organic base in an amount sufficient to substantially dilute the sulfuric acid, and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

11. A process for producing gasoline boiling range hydrocarbons from isoparaffin and olefin hydrocarbons which comprises simultaneously contacting an isoparaffin and an olefin at an alkylating temperature under a liquefying pressure with sulfuric acid of approximately 90–105% concentration to which has been added a substantially neutral organic compound of the reaction between an organic base and sulfuric acid in an amount sufficient to substantially dilute the sulfuric acid, and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

12. A process for producing gasoline boiling range hydrocarbons from isoparaffin and olefin hydrocarbons which comprises simultaneously contacting an isoparaffin and an olefin at a temperature in the approximate range of −20 to +30° C. under a liquefying pressure with sulfuric acid of approximately 90–105% concentration to which has been added a substantially neutral organic compound of the reaction between an organic base and sulfuric acid in an amount sufficient to substantially dilute the sulfuric acid, and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form heavier hydrocarbons boiling in the gasoline range.

JACQUE C. MORRELL.